United States Patent
Deivasigamani et al.

(10) Patent No.: US 8,271,143 B2
(45) Date of Patent: Sep. 18, 2012

(54) CONTROL SYSTEM METHODS FOR NETWORKED WATER HEATERS

(75) Inventors: Sridhar Deivasigamani, Peoria, IL (US); Sivaprasad Akasam, Peoria, IL (US)

(73) Assignee: Intellihot Green Technologies, Inc., Galesburg, IL (US)

( * ) Notice: Subject to any disclaimer, the term of this patent is extended or adjusted under 35 U.S.C. 154(b) by 0 days.

(21) Appl. No.: 13/435,223

(22) Filed: Mar. 30, 2012

(65) Prior Publication Data

US 2012/0191259 A1 Jul. 26, 2012

Related U.S. Application Data

(62) Division of application No. 12/699,487, filed on Feb. 3, 2010, now Pat. No. 8,175,752.

(60) Provisional application No. 61/149,418, filed on Feb. 3, 2009.

(51) Int. Cl.
*G05D 7/00* (2006.01)
*G05B 13/00* (2006.01)

(52) U.S. Cl. .......... 700/282; 700/275; 122/1 C; 237/8 A

(58) Field of Classification Search .................... 700/19, 700/20, 275, 282, 300; 122/1 C, 13.01; 237/2 R, 237/8 R, 8 A, 19; 236/21 B; 126/615
See application file for complete search history.

(56) References Cited

U.S. PATENT DOCUMENTS

| | | | | |
|---|---|---|---|---|
| 5,544,036 A | * | 8/1996 | Brown et al. | 700/277 |
| 6,453,993 B1 | * | 9/2002 | Bujak, Jr. | 237/2 R |
| 6,591,901 B2 | * | 7/2003 | Bujak, Jr. | 237/8 A |
| 6,644,398 B2 | * | 11/2003 | Bujak, Jr. | 237/8 A |
| 7,058,457 B2 | * | 6/2006 | Kuwahara et al. | 700/19 |
| 7,506,617 B2 | | 3/2009 | Paine | |
| 7,819,334 B2 | * | 10/2010 | Pouchak et al. | 237/8 A |
| 2004/0176858 A1 | * | 9/2004 | Kuwahara et al. | 700/275 |
| 2007/0144458 A1 | | 6/2007 | Mukomilow | |
| 2008/0216771 A1 | | 9/2008 | Paine | |
| 2009/0064944 A1 | | 3/2009 | Paine | |

OTHER PUBLICATIONS

Grand Hall Enterprise Co., Ltd., Eternal Advanced Hybrid Water Heating Operator's Manual, Jul. 4, 2009, pp. 3 and 8, 157110293, Grand Hall Enterprise Co., Ltd., Taipei, Taiwan.

* cited by examiner

*Primary Examiner* — Charles Kasenge
(74) *Attorney, Agent, or Firm* — Tracy Jong Law Firm; Tracy P. Jong; Cheng Ning Jong

(57) ABSTRACT

Disclosed is a control system for controlling a plurality of fluidly and operably connected water heaters to meet a hot water demand such that overall efficiency is maximized and usage disparity between water heaters is minimized. There is further disclosed a method for detecting a small system demand in said network by adjusting the setting of each flow limiting valve of each water heater. There is still further disclosed a method for enabling seamless addition or removal of a heater in service and heating load distribution to water heaters.

7 Claims, 4 Drawing Sheets

CONTROL SYSTEM METHODS FOR NETWORKED WATER HEATERS

PRIORITY CLAIM AND RELATED APPLICATIONS

This divisional application claims the benefit of priority from provisional application U.S. Ser. No. 61/149,418 filed Feb. 3, 2009 and non-provisional application U.S. Ser. No. 12/699,487 filed Feb. 3, 2010. Each of these applications is incorporated by reference in its entirety.

BACKGROUND OF THE INVENTION

1. The Field of the Invention

The present invention relates generally to water heaters, and more specifically, to methods for a control system used with fluidly and functionally connected water heaters.

2. Background Art

The art of using water heaters in cascaded fashion to meet large water heating loads is not new. In a cascade system, a plurality of water heaters is used to participate in sharing water heating load to meet a demand. Typically, in a large commercial building, apartment complex, hotel or laundromat, the demand for hot water can range from zero to a very large demand in an instant. Therefore, a system capable of providing a demand in real time ranging from very small to very large is needed.

A single commercial or residential hot water heater is incapable of providing such a wide ranging demand in real time. Another drawback of using a single unit under such circumstance is that it provides a single point of failure. When a single water heater is removed for repair or maintenance, the entire building would be without hot water. Other drawbacks of using a single water heater include the excessive physical size and inefficient heating associated with excessive physical size. One solution commonly used in solving the drawbacks associated with using a single heater for a severely varying and large demand is to leverage the heating capacity of multiple water heaters. As such, multiple water heater units may be cascaded to be fluidly and functionally connected to form a network of water heaters so that one water heater can be turned on to service a small demand while multiple units can be turned on simultaneously to service a sudden change to a large demand. Furthermore, a cascaded system involving multiple water heaters affords failure redundancy not available in a single water heater system. One or multiple units may be removed for service without interrupting the operation of remaining water heaters in the network.

In a conventional cascade system, the last water heater turned on is the modulating boiler while the capacity of other previously selected and turned on water heaters is pegged at their maximum output. As such, the last water heater turned on may experience excessive cycling on and off if a requested demand falls within a dead band. Various control schemes have been devised to provide for those situations where the overall heat demand for the system of a plurality of water heaters falls within a zone lying between the maximum heat output of a water heater and the sum of the maximum heat output of this water heater and the minimum heat output of the next adjacent water heater. This zone, which may be referred to as a dead band or dead zone, presents unique operational problems because the next adjacent boiler cannot modulate within that range.

Published US patent application 2008/0216771 entitled "CONTROL SYSTEM FOR MODULATING WATER HEATER" discloses a control system which minimizes the cycling on and off of such next adjacent boiler if the overall demand falls in a dead band. The control system is claimed to be particularly suited for use with a plurality of modulating water heaters, which may be boilers, arranged for control in a cascade sequence where a first boiler is brought online at its firing point and is then continuously modulated up to its maximum output, and then, the first boiler is maintained at its constant output while firing a second boiler which is then modulated from its firing point up to its maximum output as the overall heat demand on the system increases. In a similar manner, each boiler is brought up to its maximum output before the next adjacent boiler is fired, and all previously fired boilers are maintained at maximum output with the modulation for the system coming from modulation of the last fired boiler. While heater cycling is minimized, the '771 application falls short of addressing the issue of distributing flow to conserve energy.

In conventional cascade water heater systems, there often exists a significant disparity in usage between water heaters in a network. The order in which water heaters are turned on is fixed. A small demand causes a first water heater to turn on. As demand increases, more water heaters are turned on. As a result, the water heaters arranged to turn on first experience significantly higher accumulated usage than others, especially ones serving low demands. Water heaters experiencing higher accumulated usage require more regular preventative or unscheduled maintenance while others are underutilized. One attempt to solve such a problem is evidenced in water heaters marketed under the trade name "Eternal Advanced Hybrid Water Heating" by Grand Hall Enterprise, Ltd. The operator's manual labeled 157110293 and dated Jul. 4, 2009 introduces a host and sub concept in which a host unit is selected as the first unit to fire when demand for hot water is detected and it control multiple sub units. According to "Specifications and Features" (page 3) and "MCU Operational Sequence Flow Chart" (page 8) sections of this operator's manual, the designation of a water heater controller as the host is changed every 24 hours in order to distribute wear and tear across all units in a networked system.

Published US patent application 2008/0216771 further discloses a scheme in which each boiler includes a controller and may serve as a lead boiler and its controller as the master controller. The role of lead boiler is periodically rotated between each of the boilers in the system so as to substantially equalize the number of operating hours experienced by each boiler. The practice of using operating hours alone as a measure to estimate a water heater's remaining life is fraught with uncertainties since there are other significant factors affecting the water heater's remaining life. In use, a water heater delivers an amount of hot water at a temperature over a period of time. Given a fixed number of operating hours, the damage done to a water heater used to deliver water at 140 degrees Fahrenheit is substantially different than the damage done to a water heater used to deliver water at 102 degrees Fahrenheit. Based on this premise, the applicants believe that there needs to be an improved or more accurate method of estimating remaining life to efficiently control water heaters in a networked or cascaded system.

SUMMARY OF THE INVENTION

The present device overcomes the shortcomings of the prior art by providing one or more structures and methods for controlling water heaters in a networked or cascade system. In accordance with the teachings of the present invention, there is provided a method for controlling a plurality of fluidly and operably connected water heaters in a network to meet a system demand. The method uses overall efficiency and usage history as two primary factors in determining the heating load a water heater is required to provide in order to meet the system demand. The method comprises the steps of providing a value corresponding to relative remaining life of each water heater of the network and a value corresponding to minimum output of each water heater of the network, obtaining a number of participating water heaters required to service the system demand, obtaining an average heating load, selecting participating water heaters and setting and activating each of the participating water heaters at the average heating load to provide a total load meeting the system demand.

One challenge encountered with controlling a plurality of fluidly and operably connected water heaters in a network is to provide the ability to detect a small system flow. In accordance with the teachings of the present invention, there is provided a method for detecting a small system flow. The method takes advantage of a flow limiting valve, a flow sensor, a value corresponding to a predetermined potential system demand and a value corresponding to the maximum output of a water heater in the network. The method comprises the steps of obtaining a number of participating water heaters required to service the predetermined potential system demand, obtaining an average flow limiting valve setting, selecting participating water heaters and setting and activating the flow limiting valve of each of the participating water heaters at the average flow limiting valve setting.

In one aspect of the invention, a unique control scheme is provided to enable the processes of seamlessly adding a water heater to or removing a water heater from and assigning a heating load to a water heater in a fluidly and operably connected water heater network, wherein each water heater of the network has a controller which communicates with other water heater controllers within the network via a communication bus and each controller maintains a list of usage planning data. The method comprises the steps of supplying power to each water heater of the network, configuring the controller of each water heater to broadcast a message to a communication bus of the network, wherein the message includes an ID (identification) and usage planning data, configuring the controller of each water heater to listen to and receive messages from other controllers on the communication bus, reconciling the list of usage planning and sorting the list based on a predetermined key to produce a sort result, executing a function based on the sort result and configuring the controller of the water heater to update its usage planning data.

Accordingly, a feature and advantage of the present device is its ability to provide a cascade water heater control system that maximizes thermal efficiency while minimizing disparity in wear across all water heaters in the system.

It is another object of the present invention to provide a cascade water heater control system that minimizes operating cost while minimizing disparity in wear across all water heaters in the system.

It is yet another object of the present invention to provide a cascade water heater control system capable of detecting a small flow.

It is yet another object of the present invention to provide a cascade water heater control system that is plug and play.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification and claims. The present invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
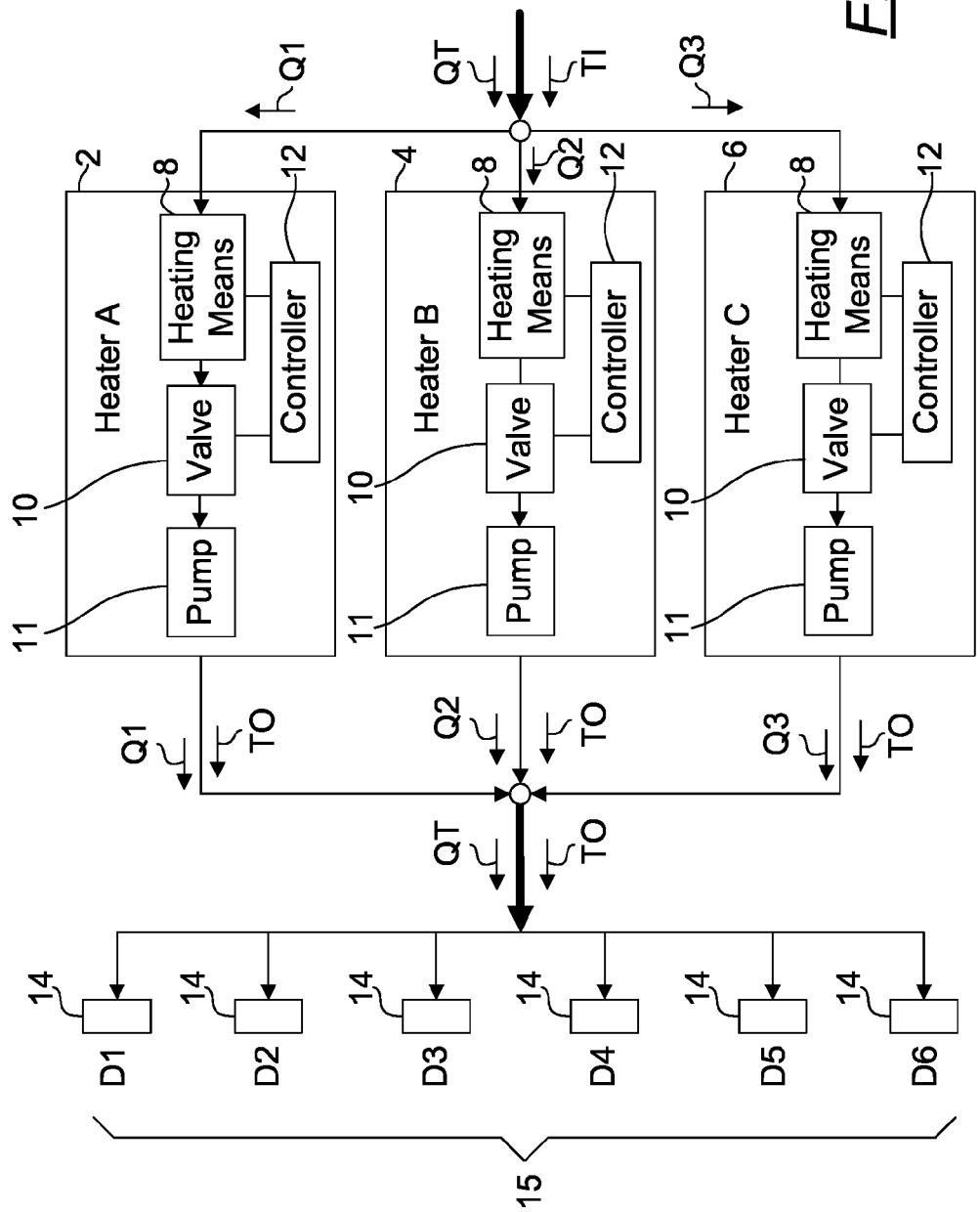
FIG. 1 is a block diagram illustrating a water heating system comprising a plurality of water heaters controlled using the present control system.

The drawings are not to scale, in fact, some aspects have been emphasized for a better illustration and UNDERSTANDING OF THE WRITTEN DESCRIPTION.

PARTS LIST

2—first water heater
4—second water heater
6—third water heater
8—boiler or heating means
10—flow limiting valve
11—pump
12—water heater controller
14—point of demand
15—system demand
16—system demand requested at point or points of demand
18—not used
20—step of obtaining number of participating water heaters
22—step of obtaining average heating load
24—step of selecting participating water heaters based on relative remaining life
26—step of setting and activating participating water heaters to average heating load
28—list of relative remaining life of all water heaters in network
30—not used
32—step of obtaining number of participating water heater valves sufficient to enable potential system flow
34—step of obtaining average valve setting for an individual water heater valve
36—step of selecting participating water heater valves based on relative remaining life

38—step of setting and activating participating water heaters to average individual valve setting
40—step of supplying power to a controller
42—step of broadcasting internal ID and usage planning data
44—step of listening to or receiving external ID and usage planning data
46—step of updating list
48—step of removing old data from list
50—step of sorting remaining data in list based on a key
52—step of executing a function based on sort result
54—decision to execute additional function
56—step of updating internal usage planning data
TI—input water temperature
TO—output water temperature
QT—total flow
Q1, Q2, Q3—individual flow through water heaters A, B and C Particular Advantages of the Invention In accordance with the present invention, a novel control method uses efficiency and usage history as two primary factors in determining the heating load a water heater is required to provide in order to meet a system demand. Thus, the usage is distributed amongst all water heaters connected in a network in order to minimize usage variation between individual units and maximize efficiency.

The practice of using operating hours alone as a measure to estimate a water heater's remaining life is fraught with uncertainties since there are other significant factors affecting the water heater's remaining life. In accordance with the present invention, the concept of normalized operating hours is used, where normalized operating hours represent expended energy, thermal cycle count, blower speed, flow rate, outlet-inlet water temperature difference, and the like.

In a fluidly connected network of a plurality of water heaters, the flow experienced in each water heater of the network is lower than the flow experienced in a system consisting of a single water heater if the flow through each water heater of the network is unrestricted. The flow rate experienced in a water heater in a network is a fraction of the total flow of a system. Therefore, a demand that is detectable in a single water heater system may not be detected by a flow sensor associated with a water heater in a network of water heaters. In accordance with the present invention, there is provided an ability to detect a small system demand in a plurality of fluidly connected water heaters.

In accordance with the present invention, a true masterless control scheme is provided. The control scheme does not require physical setup of an identification number during installation nor does it require a master-slave designation which unnecessarily complicates the functional relationship of one water heater with other water heaters in a network. The ability to add or remove a water heater at will without disrupting the existing service is provided. Continuity of service is provided even when there is one or more water heaters that are non-functional or when one or more water heaters have been removed for service or repair. When such an event occurs, a water demand is met by heating load distribution to the remaining functional water heaters. When necessary, additional water heaters may be added without disrupting existing water heating operation.

DETAILED DESCRIPTION OF A PREFERRED EMBODIMENT

Figure 2:
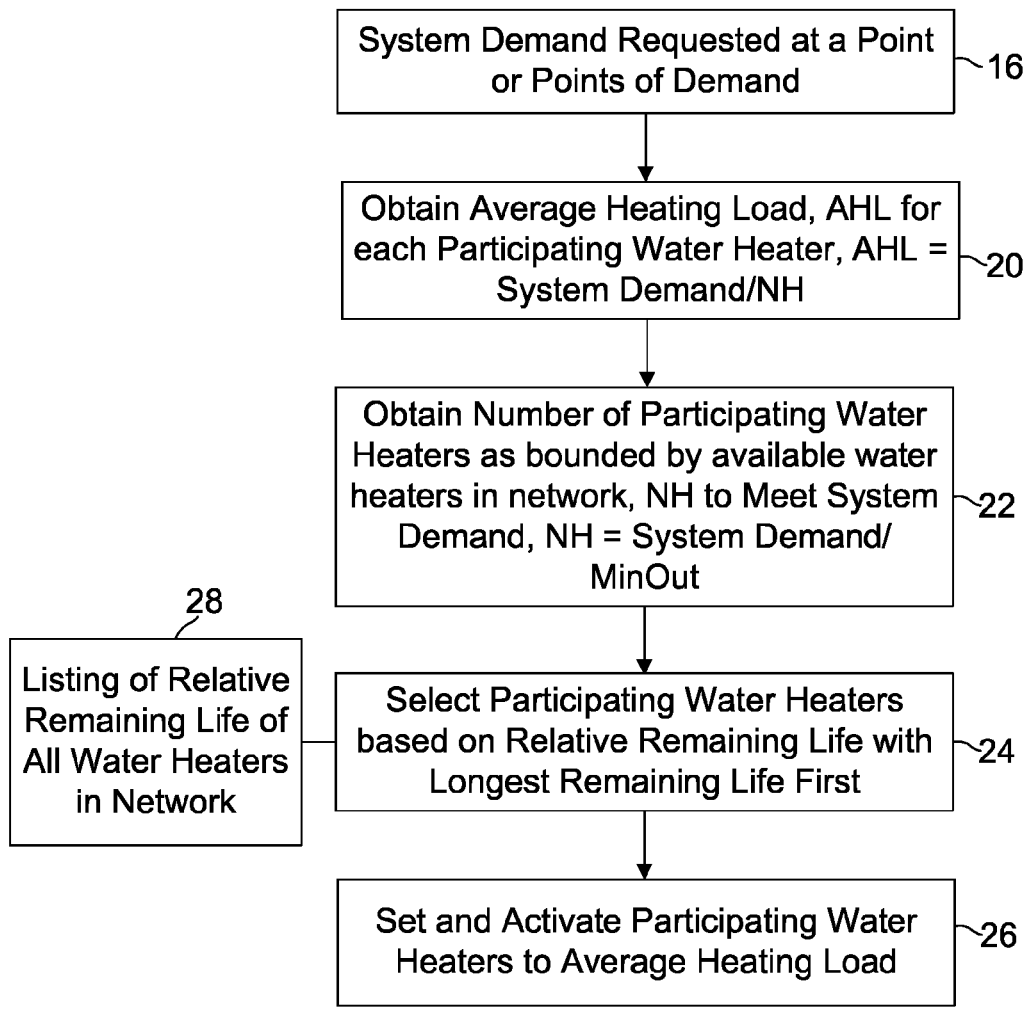
FIG. 2 is a flow diagram illustrating a novel method of the present control system used to assign heating load to all water heaters in a system including a plurality of water heaters.

As a general overview, and with reference to FIG. 2 in particular, there is provided a method for controlling a plurality of fluidly and operably connected water heaters in a network to meet a system demand. The method comprises the steps of: (1) providing a value corresponding to relative remaining life of each water heater of the network and a value corresponding to minimum output of each water heater of the network 16, (2) obtaining a number of participating water heaters required to service the system demand 20, (3) obtaining an average heating load 22, (4) selecting participating water heaters 24 and (5) setting and activating each of the participating water heaters at the average heating load 26 to provide a total load meeting the system demand. As will be described in greater detail with respect to the particular steps of the method, the method uses efficiency and usage history as two primary factors in determining the heating load a water heater is required to provide in order to meet the system demand. Efficiency may contemplate thermal efficiency, least cost option or both.

The novel control method is illustrated and described with reference to FIG. 2, however, for a better understanding of the novel control method, it is instructive to describe a networked water heater system in which the control method may be used. FIG. 1 is a block diagram illustrating a water heating system comprising a plurality of water heaters 2, 4, 6 controlled using a novel control system (described in greater detail below with reference to FIGS. 2-4). In the example illustrated in FIG. 1, three water heaters 2, 4, 6 (also designated A, B, C on FIG. 1) are connected in parallel configuration such that a system demand 15 is cooperatively met by the flows Q1, Q2 and Q3 of water heaters 2, 4 and 6 respectively. A total of six points of demand D1, D2, D3, D4, D5 and D6 are shown in this figure, which cumulatively form the system demand 15. However, it is to be understood that the example presented herein is for illustrative purposes only. Any number of water heaters, flow limiting valves and pumps may be controlled using the present control system and any number of points of demand 14 may be used, provided that the combined heating capacity of the system is sized appropriately to meet demand.

Each of the water heaters 2, 4, 6 comprises a flow limiting valve 10, a pump 11, at least one heating means 8 and a controller 12. The fluid flow through each flow limiting valve 10 can be altered from zero flow to a flow corresponding to a fully open (maximum flow) valve setting. The heating means 8 is commonly a burner, a combined blower and burner unit or an immersive electric element, however the control system is not so limited. Any known or developed means of heating hot water may be suitably adapted to the present system. There are numerous ways to provide hot water. Residential and commercial applications typically use gas or electric water heaters or a combination thereof. A gas water heater typically uses a burner to generate heat and a heat exchanger to transfer the generated heat to the water supply demanded by a user. Traditionally, a large reserve tank is used to hold a large volume of heated water in anticipation of a hot water request. If a request is not imminent, heat energy is unnecessarily lost to the surroundings and wasted. Recently, tankless water heaters have gained popularity due to concerns of high energy costs and depletion of energy sources.

In a tankless water heater, a demand of hot water is met by near instantaneous heating of water to the user. Little is wasted since water is not heated long before it is used. A tankless water heater comes in a variety of configurations. A high efficiency model typically comes with a blower with or without speed control. The use of an electric blower is common in heaters involving inverted burners where hot combustion gases are forced down against gravity through a heat exchanger coil.

An electric water heater, on the other hand, typically comprises an immersion heating coil which comes in direct contact with a body of water to be heated. Even though the ensuing discussion focuses on a control system designed for tankless water heaters, each comprising a variable speed blower, a flow limiting valve and a pump, it is to be understood that the present inventive concepts are applicable to water heaters of other modes of heating or having equivalent control instruments.

For the purposes of the following examples, a combined blower and burner unit will be used. In use, when the system demand 15 becomes non-zero, a cold water flow with a flow rate of QT and temperature of T1 is established upstream of the water heaters 2, 4, 6. This total cold water flow rate QT is made up of individual flows with flow rate of Q1, Q2 and Q3 which are fed through water heaters 2, 4, 6 respectively, to be heated to temperature TO. Flow rates Q1, Q2 or Q3 are sized based on the heating load assigned to water heaters 2, 4, 6 by their respective controllers 12. The method by which each water heater is assigned a heating load is the subject of the present invention. The heating load assigned to each heater directly corresponds to the flow allowed to flow through each heater.

In one aspect of this embodiment and referring again to FIG. 1, flow rate control is further aided with the use of a pump 11 connected inline with a flow limiting valve 10. Typically, a tankless water heater is equipped with a pump that cycles water internally within the internal plumbing of the water heater to deliver water at a desired temperature. Where the pump is not used for internal recirculation, the method may optionally and additionally include the step of activating the pump to increase flow rate. Where opening the flow limiting valve alone is insufficient in increasing a flow to a desired flow rate quickly due to limited water pressure, the method may optionally and additionally include the step of activating the pump to increase flow rate to expediently bring the flow rate to the desired level.

FIG. 2 is a flow diagram illustrating a novel method of the present control system used to assign load to all water heaters in a system. The system has a plurality of water heaters that are interconnected operably, fluidly and electronically in a network. The method uses overall efficiency and remaining life as keys to assigning load to water heaters of the network. Heating load is assigned based on a distribution which maximizes overall efficiency and minimizes disparity in remaining life across all water heaters in a network.

The present invention uses a novel true masterless control scheme, wherein each controller of the network is responsible for determining the actions the water heater has to take to fulfill a system demand. Although a master-slave control system, which is commonly used in prior art cascade water heating systems may be used to benefit from the present novel method of assigning heating load to each water heater, the benefits of using a true masterless control scheme will become apparent in discussions pertaining to FIG. 4.

In one aspect, thermal efficiency is the amount of thermal energy output versus thermal energy input. In systems where the primary energy consuming equipment is a gas burner, thermal efficiency is a suitable representation of the overall efficiency. Thermal energy output in a burner unit is a measure of the work done to increase the temperature of an amount of water by a certain number of degrees. Thermal energy input in a burner unit is a measure of the heat content of a fuel that is consumed in order to produce a thermal energy output. In any burner based systems, there exists an operating point that corresponds to condition where the highest thermal efficiency is achieved. It has been discovered that thermal efficiency is inversely proportional operating capacity, i.e., the flow rate. As the flow rate increases, the thermal efficiency of a burner system drops. In order to achieve maximum thermal efficiency, the smallest flow rate is desired. However, a typical water heater is capable of detecting a flow only if its flow rate rises above certain threshold. Therefore, there exists a minimum flow rate or output requirement which must be met before the flow rate of a water heating system can be meaningfully modulated. The heat load related to this minimum flow rate is termed minimum heat load hereinafter.

In a second aspect of this embodiment, overall efficiency is the least cost option. In a heating system comprising various energy consuming equipment components, energy usage is not limited to a single mode. For instance, a combined gas burner and blower system consumes both fuel energy and electric energy. As another example, a combined gas burner and immersive electric element system also uses both fuel and electric energy. Furthermore, it is well known that the cost per unit electrical energy can differ tremendously from the cost per unit thermal energy. The per unit cost for each mode of energy can also change daily depending on its market value at a given time. Therefore, the practice of optimizing heating load distribution based merely on thermal efficiency alone may not meet consumer objectives. In this second aspect of the embodiment, the control method utilizes a heating distribution means based on least operating cost. As an example, in a cascade system having two water heaters, a system demand which can be met using one water heater alone may be equally distributed to both water heaters. In accordance with the least operating cost strategy, the decision to use one or both water heaters is based on the expected total operating cost of using one as compared to two water heaters to meet the same system demand.

Remaining life shall be defined as a measure indicating the amount of useful life a water heater has until a repair, maintenance or replacement is required, or anticipated to be required based on statistical data. Remaining life is inversely proportional to the amount of "damage" which has been inflicted upon it. Water heater damage is affected by various factors related to the normal operation, such as, for example, the expended energy, thermal cycle count, deltaT, flow rate and blower speed associated with each water heater. The expended energy is defined as the cumulative energy (for example, thermal and electrical) consumed in operating a water heater. The thermal cycle count is defined as the number of events where the flow rate through a water heater changes by 1.5 gallons per minute ("gpm"). deltaT is defined as the difference between heater outlet and inlet temperature. To illustrate, damage at any given time is calculated as the addition of scaled sum of energy expended raised to the power X, scaled sum of thermal cycle count raised to the power Y and scaled sum of blower speed multiplied by flow rate and deltaT raised to the power Z over time, where X, Y, Z, A, B, C are factors specific to a water heater or a system having a plurality of water heaters.

$$\text{Damage} = A^*(\text{sum of}(\text{energy expended})^\wedge X \text{ over time}) + B^*(\text{sum of}(\text{thermal cycle count})^\wedge Y \text{ over time}) + C^*(\text{sum of}(\text{blower speed}^*\text{flow rate}^*\text{delta}T)^\wedge Z)\text{over time})$$

Referring again to FIGS. 1 and 2, a system demand 15 is first requested as shown in step 16 at one or more points of demand 14. Upon detecting a system demand, each controller 12 executes a series of steps to determine the amount of heating load it needs to provide to achieve both maximum overall efficiency and optimal usage distribution.

In Step 20, the number of participating water heaters required to meet the system demand 15 detected in step 16 is determined. The number of participating water heaters is obtained by dividing the system demand 15 by the minimum output of each water heater. For instance, if the system demand 15 is 10 gpm and the minimum output of each of the water heaters is 1 gpm, the number of participating water heaters would be ten if there are ten or more available water heaters in the network. Using the overall efficiency method based on thermal efficiency, the demand would be met by using as many water heaters as possible. If there are five available water heaters, the number of participating water heaters would be limited to five. However, if the system demand 15 is 3 gpm and there are five available water heaters, the number of participating water heaters would then be three since each of the water heaters is capable of providing a minimum heating load of 1 gpm to meet a total of 3 gpm system demand. In such a case where there is at least one water heater that is not required to be turned on, it becomes a "reserve water heater." When a reserve water heater exists, various measures may be taken in anticipation of an increase in demand: starting internal and/or external recirculation circuit of a tankless water heater to minimize a delay in delivering hot water to a demand point.

In step 20, if the least cost option is selected, the system demand will be satisfied by using a group of participating water heaters such that the system would incur the lowest operating cost. In one embodiment, the controller of each water heater calculates the expected total operating cost of operating one or more water heaters to meet a system demand based on the operating parameters of the water heater it controls. In another embodiment, the controller of each water heater calculates the expected total operating cost of operating external water heaters based on operating parameters received from external water heaters.

From the determined number of participating water heaters, an average heating load is determined. Step 22 involves calculating the average heating load of a participating water heater. The average heating load is obtained by dividing the system demand 15 by the number of participating water heaters.

Block 28 represents a list of relative remaining life of all water heaters retrieved from a memory location functionally connected to the controller of a water heater. In Step 24, participating water heaters are selected from all water heaters in the network. This step is achieved by selecting the required number of participating water heaters from those water heaters having the longest remaining life. For instance, assume the number of required participating water heaters to be three. There are five water heaters 1, 2, 3, 4, 5 having remaining life values of L1, L2, L3, L4 and L5 respectively:

L1 is less than L2,
L2 is less than L3,
L3 is less than L4, and
L4 is less than L5.

In this case, then L3, L4 and L5 would be selected as participating water heaters in Step 24 since they possess longer remaining life as compared to L1 and L2.

In Step 26, each water heater's controller identifies whether it is one of the selected participating water heaters by comparing its ID to the ID associated with each participating water heater. If a positive identification is returned, the water heater is turned on or activated to meet the system demand by supplying the average heating load to the system.

In accordance with the present invention, the control system uses a true masterless control scheme which does not require physical setup of an identification number during installation nor does it require a master-slave designation which unnecessarily complicates the functional relationship of one water heater with other water heaters in a network. The concept of rotating the role of lead water heater in a multiple water heater setup is not new. Published US patent application 20080216771 discloses such a scheme in which each boiler includes a controller and may serve as a lead boiler and its controller as the master controller. The role of lead boiler is periodically rotated between each of the boilers in the system so as to substantially equalize the number of operating hours experienced by each boiler. A substantially similar strategy is employed by Grand Hall Enterprise, Ltd. in its "Eternal Advanced Hybrid Water Heating." The operator's manual labeled 157110293 and dated Jul. 4, 2009 introduces a host and sub concept in which a host unit is selected as the first unit to fire when demand for hot water is detected and it control multiple sub units. In this setup, the designation of a water heater controller as the host is changed every 24 hours in order to distribute wear and tear across all units in a networked system. Each controller of this setup is equipped with a dipswitch which must be physically or correctly set prior to use in order to distinguish one controller from another. The present novel control method improves upon the prior art by removing the need for such a manual step which is not only time consuming but also costly due to the additional hardware required and prone to installation error.

A true masterless control scheme of the present invention enables the addition of a water heater simply by connecting the water heater fluidly to all existing water heaters in the network and connecting the water heater's controller to a communication bus shared by all existing water heater controllers in the network. The true masterless control scheme further enables the removal of a water heater from service in the network simply by disconnecting the water heater fluidly from the network and disconnecting the water heater's controller from the communication bus shared by all existing water heater controllers in the network. Each controller of a water heater in a true masterless control scheme is responsible for determining the actions the water heater has to take to fulfill a system demand, thereby simplifying the setup of a water heater network and minimizing the potential for setup errors.

Figure 3:
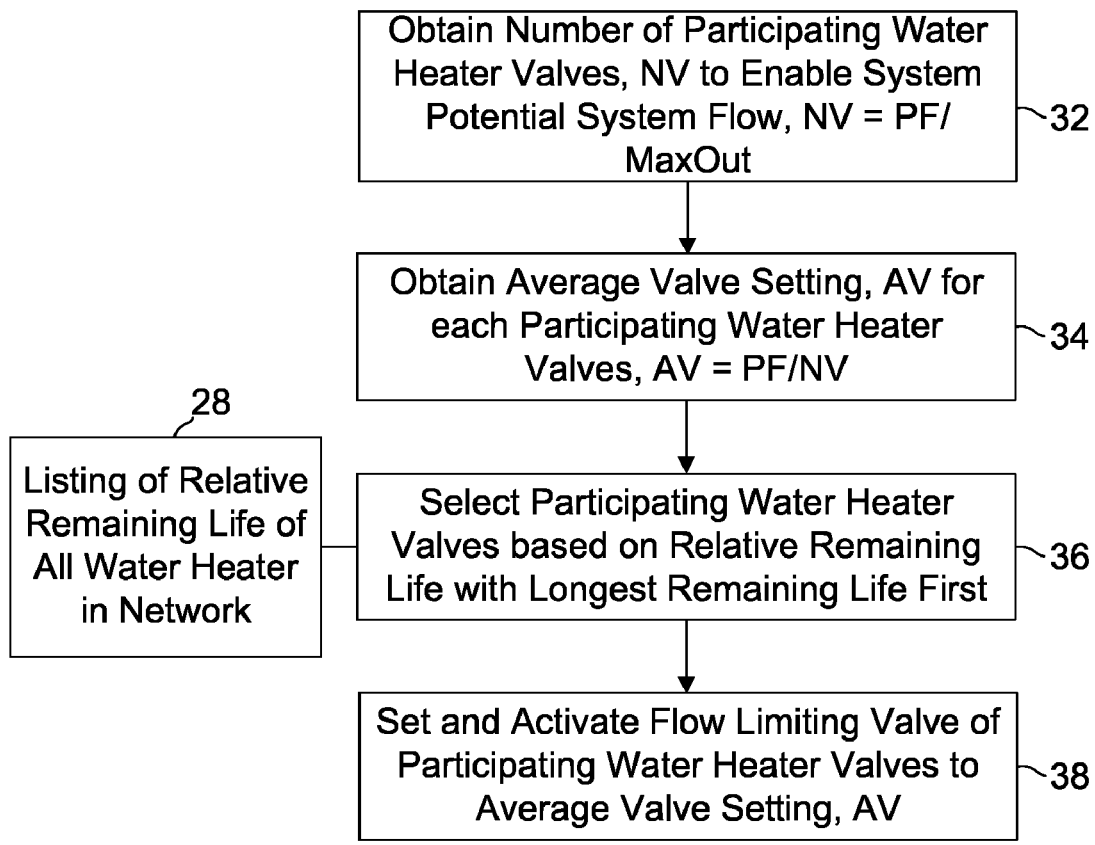
FIG. 3 is a flow diagram illustrating a novel method of the present control system used to detect a small hot water demand in a system including a plurality of water heaters.

FIG. 3 is a flow diagram illustrating a novel control system method used to detect a small hot water demand in a system with a plurality of water heaters. Typically, a water heater is equipped with a flow sensor capable of detecting a flow rate above a minimum threshold. In a fluidly connected network of a plurality of water heaters, the flow experienced in each water heater of the network is lower than the flow experienced in a system consisting of a single water heater if the flow through each water heater of the network is unrestricted. The flow rate experienced in a water heater in a network is a fraction of total flow of a system. Therefore, a demand that is detectable in a single water heater system may not be detected by in a network of water heaters.

The present novel control method enables fluidly connected water heaters to detect a demand having a flow rate equal or greater than the minimum detectable threshold of a water heater, in particular water heaters having a flow limiting means, such as that provided by a flow limiting valve. When the water heaters of a network are first turned on or when a system demand has ceased or when a demand has dropped below a predetermined limit, a control procedure is executed to prepare for the detection of the next small system flow.

In Step 32, the number of participating water heaters required to meet a potential system flow is determined. A potential system flow is defined as a typical starting flow that is predetermined based on an expected usage habit of the water heating system. The number of participating water heaters is determined by dividing the potential system flow by the maximum output of a water heater in the network. For instance, if the potential system flow is 9 gpm and the maximum output of a water heater in the network is 5 gpm, the number of participating water heater is then determined to be two.

In Step 34, an average valve setting for each participating water heater is determined. The average valve setting is obtained by dividing the potential system flow by the number of participating water heaters. Continuing on the foregoing example, the average valve setting is determined to be 4.5 gpm.

In step 36, participating water heaters are selected from the network. This step is achieved by selecting a number of water heaters having the longest remaining life with reference to a list of relative remaining life of all water heaters retrieved from a memory location functionally connected to the controller of a water heater (Block 28). Upon identifying the flow limiting valves whose valve setting needs to be adjusted, step 38 proceeds to set and activate the valve setting of the identified flow limiting valves to correspond to 4.5 gpm each.

Figure 4:
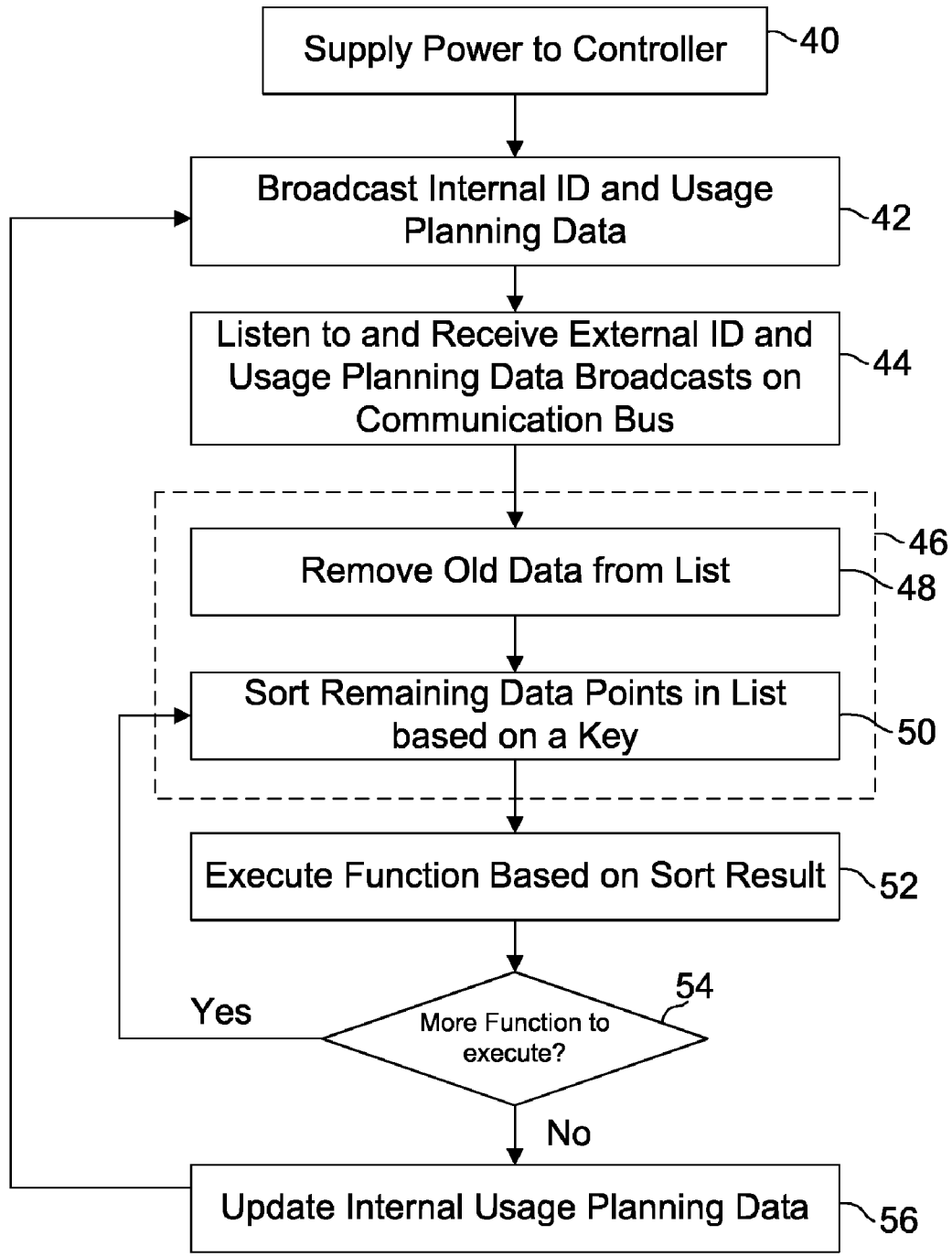
FIG. 4 is a flow diagram illustrating a novel method of the present control system used to enable seamless addition or removal of a heater in service and heating load distribution to water heaters.

FIG. 4 is a flow diagram illustrating a present novel control system method used to enable seamless addition or removal of a heater in service and heating load distribution to water heaters. A plurality of water heaters is fluidly connected and the controller of each of the plurality of water heaters is operably connected in a network. Each controller is preferably equipped with a communication means common to all controllers on the network that communicates via a common bus. An exemplary protocol commonly used in the industry is the Modbus protocol communicated over a serial EIA-485 physical layer. Other communication protocols supporting hostless communication, such as CAN or Ethernet and their supporting hardware may also be suitably adapted to perform the intended function. The communication bus is established via hard-wire connection or wireless means.

The ensuing description will be presented from the perspective of a control algorithm running in a controller. When electrical power is supplied to a controller (step 40), a routine is started where the controller starts making one or more broadcasts to the communication bus. In Step 42, a message comprising an internal ID (identification) code used to identify the controller from which the message originates and a set of usage planning data is broadcasted. In one embodiment, the ID is a factory-set serial number unique to a controller. The message comprises pertinent information which all the controllers in the network require to determine heating load distribution. In one embodiment, a usage planning data set comprises a normalized relative remaining life value of the broadcasting controller.

In Step 44, the communication bus is listened to and broadcast messages from external controllers are received. Identical to the internal message format, the external messages also comprise IDs and usage planning data sets. Upon receiving external messages, the controller parses pertinent information and inserts such information into a list. In one embodiment, the ID and normalized relative remaining life value are harvested from each message and put on such list.

In Step 46, the list is reconciled by removing expired data points from the list. A data point harvested from a broadcast message received from an external source and inserted into the list is retained for a predetermined amount of time. Upon the expiration of this predetermined amount of time, the data is removed from the list (step 48). However, if a new message is received from a water heater whose ID exists in the list, the current data point will be replaced by the data point parsed from the new message. As such, a water heater which has just become unavailable will be removed from the list while a newly added water heater to the network or an existing available water heater will remain and acknowledge its availability by broadcasting messages.

Upon finishing reconciliation of the list's data points, the controller proceeds to sort the remaining data points (step 50) in the list based on a preprogrammed key. In one embodiment, the preprogrammed key is the relative remaining life. When sorting is complete, the list is ordered such that the data points are arranged in an ascending or descending order based on the relative remaining life. The controller then proceeds to execute a pre-designated function based on the sort result (step 52). In one embodiment, the pre-designated function is responsible for assigning a heating load to a water heater. The controller further determines whether another function is pending (step 54). If a pending function exists, the sorting step 50 is repeated with a preprogrammed key. If no additional functions are pending, the controller proceeds to update the usage data that belongs to the water heater it controls (step 56). The sequence is then repeated where the broadcast step 42 is again executed.

Thus it is seen that the methods of the present invention readily achieve the ends and advantages mentioned as well as those inherent therein. As will be readily appreciated by those skilled in the art, the present control methods are capable of other embodiments and of being practiced and carried out in various ways within the spirit of Applicant's inventive concept.

The invention claimed is:

1. A method for controlling a plurality of fluidly and operably connected water heaters in a network to meet a system demand, comprising steps of:
   providing a value corresponding to relative remaining life of each said water heater, a value corresponding to a minimum output of each said water heater, a flow limiting valve for each said water heater and a pump for each said water heater;
   obtaining a number of participating water heaters required to service said system demand by dividing said system demand by said value corresponding to minimum output;
   obtaining an average heating load by dividing said system demand by said number of participating water heaters in said network;
   selecting participating water heaters by identifying said number of participating water heaters having the longest relative remaining life; and
   setting and activating each of said selected participating water heaters at said average heating load to provide a total load meeting said system demand.

2. The method for controlling a plurality of fluidly and operably connected water heaters in a network to meet a system demand of claim 1, wherein said step of obtaining a number of participating water heaters comprises dividing said system demand by said value corresponding to minimum output.

3. The method for controlling a plurality of fluidly and operably connected water heaters in a network to meet a system demand of claim 1, wherein said step of obtaining a number of participating water heaters comprises estimating the total cost of operating different quantities of water heaters of said plurality of water heaters where the heating load is substantially equally distributed over said different quantities of water heaters of said plurality of water heaters and selecting the number of participating water heaters that yields a lowest cost.

4. The method for controlling a plurality of fluidly and operably connected water heaters in a network to meet a system demand of claim 1, wherein said value corresponding to relative remaining life comprises normalized factors of expended energy, thermal cycle count, blower speed, flow rate and outlet-inlet water temperature difference of a water heater.

5. The method for controlling a plurality of fluidly and operably connected water heaters in a network to meet a system demand of claim 1, wherein each of said plurality of water heaters has a controller, wherein distribution of a heating load to each of said plurality of water heaters is determined by its controller.

6. The method for controlling a plurality of fluidly and operably connected water heaters in a network to meet a system demand of claim 1, wherein each of said water heaters has a controller, wherein the heating load corresponds to a flow which is achieved by controlling concurrently said flow limiting valve of each water heater and said pump of each water heater.

7. A method for detecting a small flow in a plurality of fluidly and operably connected water heaters in a network, each of said plurality of water heaters has a flow limiting valve having a flow range of from zero to a non-zero value, a flow sensor having a minimum detectable flow, a value corresponding to a predetermined potential system demand, a value corresponding to the maximum output of a water heater in said network, comprising steps of:

obtaining a number of participating water heaters required to service said predetermined potential system demand by dividing said value corresponding to said predetermined potential system demand by said value corresponding to the maximum output of a water heater in said network;

obtaining an average flow limiting valve setting by dividing said predetermined potential system demand by said number of participating water heaters in said network;

selecting participating water heaters by identifying said number of participating water heaters having the longest relative remaining life; and setting and activating said flow limiting valve of each of said selected participating water heaters at said average flow limiting valve setting.

* * * * *